Oct. 10, 1950             S. WALD             2,525,466
SYSTEM FOR CONVERTING A VARIABLE DIRECT CURRENT
POTENTIAL TO AN ALTERNATING CURRENT OF
CONTROLLED PHASE AND AMPLITUDE
Filed Dec. 31, 1946
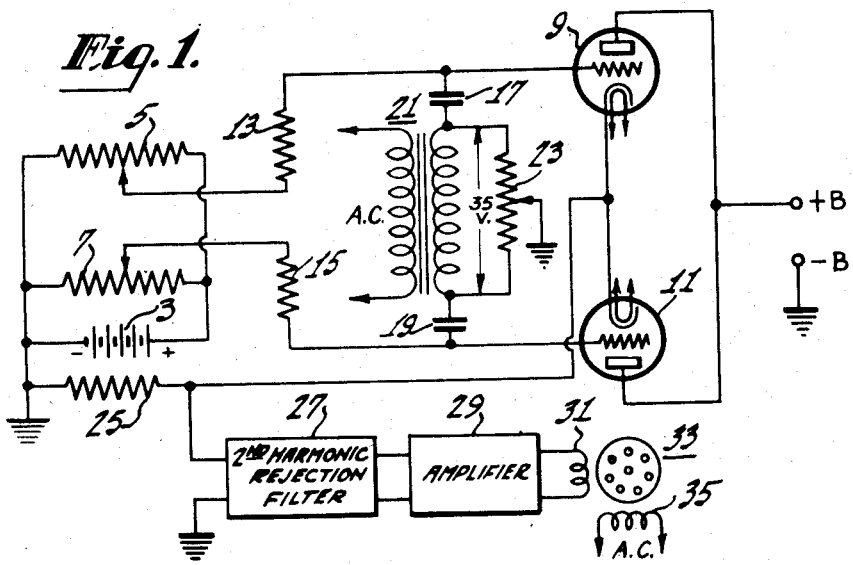
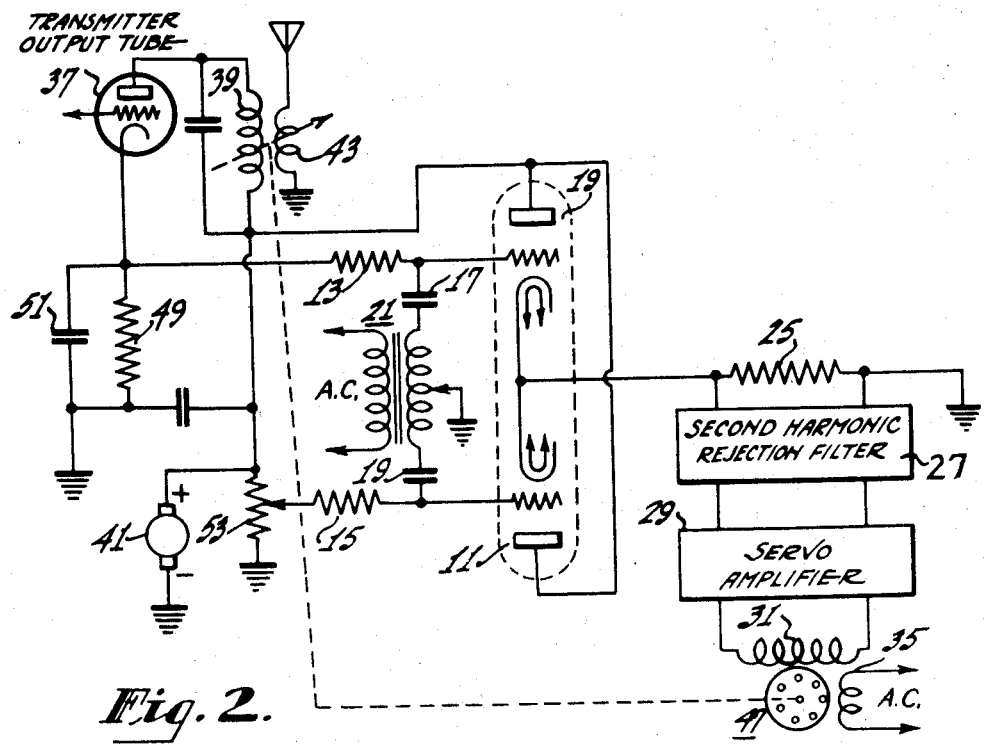
INVENTOR
Sidney Wald
BY
ATTORNEY Patented Oct. 10, 1950

2,525,466

UNITED STATES PATENT OFFICE 2,525,466

SYSTEM FOR CONVERTING A VARIABLE DIRECT-CURRENT POTENTIAL TO AN ALTERNATING CURRENT OF CONTROLLED PHASE AND AMPLITUDE

Sidney Wald, Philadelphia, Pa., assignor to Radio Corporation of America, a corporation of Delaware Application December 31, 1946, Serial No. 719,382

7 Claims. (Cl. 318—28)

This invention relates to systems for controlling the phase and amplitude of an alternating current by the relative variations of D. C. control potentials and has particular utility in the remote control of the direction of rotation of alternating current motors and in follow-up systems where a condition of unbalance controls the movement of a follow-up device, the movement of which tends to restore the initial condition of balance.

The use of a synchro-generator and synchro-motor for controlling the rotation of a remote object is well known. Frequently it is desirable to control the rotation of an alternating current motor by means of a D. C. control potential which may be, for example, produced by the movement of a controlling mechanism or which may result from a change in the electrical balance of two D. C. voltages. It is therefore necessary to provide means for converting the variation of D. C. potential into an alternating current which reverses in phase in accordance with the sense of the initial change and which corresponds in amplitude with the degree of change.

It is therefore a primary object of this invention to provide an improved method of and means for converting a change in D. C. potential into an alternating current which changes in phase and amplitude in accordance with the direction and amplitude of the change.

It is a further object of this invention to provide an alternating current of reversible phase for the control of a motor in accordance with changes in the relative amplitudes of two D. C. control potentials.

In a copending application of J. W. Conklin, Serial No. 476,903, filed February 24, 1943, now Patent Number 2,423,228 issued July 1, 1947, and assigned to the same assignee as the present invention, there is described a remote control system of the general type claimed in the present application. In accordance with the aforementioned copending application, D. C. control potentials which are variable in mutually opposite directions from a normally negative value are applied to the grid electrodes of two pairs of thermionic tubes whose plate electrodes are energized by A. C. voltages. By means of output transformers the plate impedances of the two pairs of tubes are reflected into a motor circuit to control the direction of rotation of the motor. While such a system has many practical advantages, the use of negative D. C. control voltages introduces certain limitations in its utility which it is the purpose of this invention to overcome. Also, in many cases the size and weight of the output transformers used in the motor circuit are prohibitive, as, for example, where such a system is to be used in aircraft where space and weight are at a premium.

It is therefore a further object of this invention to provide a remote control or follow-up system in which no power transformers are required, and, further, which will operate satisfactorily when positive control potentials are applied to the tube. This is important for the reason that where the system is employed to control a system in which the actuating change is already in the form of a positive variable D. C. voltage, it is not necessary to convert the control voltage to one of negative potential.

The novel features that are considered characteristic of this invention are set forth with particularity in the appended claims. The invention both as to its organization and method of operation, as well as additional objects and advantages thereof, will best be understood from the following description when read in connection with the accompanying drawings, in which Figure 1 is a circuit diagram of a remote control system in accordance with this invention, and Figure 2 is a circuit diagram of a servo system utilizing this invention.

Two independent D. C. control voltages may be obtained by various means. The general case where they are independently adjustable is illustrated in Fig. 1, the two voltages being produced by means of a battery 3 and two potentiometers 5 and 7. The negative terminal of the battery is connected to ground. The contact arms of the two potentiometers are connected to the grid electrodes of a pair of thermionic discharge devices 9 and 11 respectively, through series resistors 13 and 15. An alternating voltage of suitable amplitude and preferably of 60 cycle frequency is impressed on the grid electrodes by means of two capacitors 17 and 19 which are connected to the two terminals of the secondary of a small voltage transformer 21. A potentiometer 23 is connected across the transformer secondary, the contact arm being connected to ground. While this transformer has been shown as a separate transformer connected to the A. C. line, it is to be understood that the A. C. voltage may conveniently be derived from the tube filament transformer, if one is employed, or by suitable resistors connected across the A. C. line. Since no power is derived from the transformer it may be very small. The cathode electrodes of the two tubes are connected together and through a resistor 25 to ground. This common cathode resistor constitutes the output circuit of the two tubes, the voltage across the resistor being applied to a second harmonic rejection filter 27. The output of the filter is amplified to any suitable degree by means of an amplifier 29, the output being applied to one winding 31 of a conventional reversible induction motor 33, the other winding 35 being connected to the 60 cycle line voltage. The plate electrodes of the two thermionic discharge devices 9 and 11 are connected directly to a suitable source of D. C. potential which may be supplied by a battery, D. C. generator or the like.

The contact arm of potentiometer 23 is first adjusted to balance the amplitude of the 2 A. C. voltages which are impressed on the grid electrodes of the two tubes. While a center tapped transformer secondary may be employed, the arrangement shown provides a convenient method for insuring that the initial adjustment of the circuit is correct, since for balanced operation the two A. C. voltages should be equal in amplitude and opposite in phase.

As is well known the reversible motor 33 requires the application of alternating currents which are in phase quadrature to the two windings 31 and 35. This may be accomplished by inserting a suitable phase shifting device in circuit with winding 35, or, as in the present case, it is possible to take advantage of the inherent phase shift produced in the circuit to provide the necessary quadrature relationship. The second harmonic rejection filter 27 inherently produces a certain phase shift at 60 cycles, assuming that the normal line frequency is 60 cycles, the actual degree of phase shift depending upon the circuit constants chosen. It has been found that a rejection filter suitable for the purpose produced a phase shift of approximately 70°. In order to provide the additional phase shift necessary, use is made of the capacitors 17 and 19 which are preferably included in the grid circuit of the two tubes to prevent the transformer from short circuiting the D. C. potentials applied by the control device. By suitably selecting the values of resistor 13 and capacitor 17 and likewise the values of resistor 15 and capacitor 19, the additional phase shift may readily be obtained.

One of the features of this invention lies in the fact that the system responds to the difference between the amplitudes of the two control potentials. That is, the position of the contact arm of either potentiometer 5 or 7 may be taken as a reference voltage, and the device will then operate to rotate the motor in one direction or the other, in accordance with the relative amplitude and sense of the voltage produced by the other potentiometer. In the condition of balance, that is, when the two D. C. control potentials are equal in amplitude, each tube passes alternating current of a given amplitude, but of opposite phase, through the common cathode resistor 25. As a result, only a direct voltage is developed across the resistor and the motor 33 is not energized.

If the potential applied to the grid of tube 9 becomes more positive than that applied to the grid of tube 11, the component of current in the output resistor 25 of the phase controlled by tube 9 will be greater than the component of current in the opposite phase, and an alternating output voltage will result. This voltage is passed through the second harmonic rejection filter which eliminates the second harmonic since such current would serve no useful purpose in energizing the motor. The A. C. voltage is amplified to a suitable degree and applied to the motor to cause its rotation in a given direction. If, however, the D. C. voltage applied to the grid of tube 9 is less positive than that applied to the grid of tube 11, the output voltage will be of the opposite phase and the motor will therefore rotate in the opposite direction.

Systems previously known have required the application of negative D. C. control voltages to the control tubes, as is the case in the copending application referred to above. In the earlier systems one tube or the other was biased off to provide the discriminatory action. It is frequently desirable to control the remote operation of the motor in response to a D. C. voltage which is positive. The present invention permits direct use of such a positive voltage by reason of the fact that the use of the common cathode output resistor 25 makes the system 100% degenerative. That is, all the output voltage is applied to the cathode electrodes, and this affects the grid-to-cathode voltage of the tubes in a sense which directly opposes the applied voltage. As a result, the grid can never be driven positive with respect to the cathode, and it is therefore possible to operate the tubes with large positive D. C. control voltages. This provides a much larger degree of stability than has heretofore been obtainable, both with respect to variations in the characteristics of the tubes themselves and to variations in the line voltage, or the D. C. potential applied to the anode electrodes. A further advantage of the system illustrated lies in the fact that the tubes are operated over the linear portion of their input-output characteristics, so that the response is more linear with respect to the change of amplitude of the D. C. control potential than has heretofore been possible.

A still further advantage of the system shown is that a single ended output circuit is utilized, although alternating currents of reversible phase are available for control of the motor. The circuit also eliminates the need for push-pull output transformers which have heretofore been required, thus effecting a considerable saving in the size and weight of the equipment.

A still further advantage of the arrangement shown is that the voltage applied to either grid electrode may be considered as the reference voltage, and the operation of the device is then effected by comparing the other voltage to it. That is, the condition of balance may be determined by adjusting the value of either one of the two D. C. control potentials independently of the existing value of the other. A practical application for such an arrangement is illustrated in Fig. 2, to which reference is now made.

In the embodiment of the invention illustrated in Fig. 2, it is assumed that thermionic discharge device 37 is the output or power amplifier of a radio transmitter, not shown. The plate electrode is connected to an inductance 39 which constitutes the primary of an output transformer. The tube is energized by a source of D. C. potential 41 which is assumed to be a D. C. generator subject to undesired voltage variations. The coupling between the primary 39 and secondary 43 of the output transformer to which the load is connected is adjustable, the degree of coupling being controlled by a suitable mechanical movement coupled to a reversible motor 47 of the type utilized in the foregoing illustration. A resistor 49 is connected in the cathode circuit of the output tube 37, suitably by-passed for radio frequencies by a capacitor 51, and connected through a series resistor 13 to the grid of a thermionic discharge device 9. A voltage is derived from the D. C. generator 41 which is proportional to the generator output and whose amplitude is equal to the D. C. voltage produced across resistor 49. This is accomplished, for example, by means of a voltage divider 53. The low potential tap of voltage divider 53 is connected through a series resistor 15 to the grid of a thermionic discharge device 11. As in the preceding case, alternating voltage of equal amplitude and opposite phase are impressed on the two grid electrodes by means of a transformer 21 through series connected capacitors 17 and 19 respectively. As before, the plate electrodes of the two discharge devices 9 and 11 are connected to a suitable source of D. C. potential such as generator 41. Output is developed across the common cathode resistor 25 and is applied through the second harmonic rejection filter 27 and amplifier 29 to winding 31 of motor 47. The remaining winding 35 is connected to the line voltage.

It is well known that the degree of coupling for most efficient operation of a transmitter depends upon the amplitude of the applied plate voltage. Thus, if the plate voltage varies it is desirable to compensate for this variation by a corresponding change in the coupling of the load. It is assumed, for example, that the transmitter is an aircraft transmitter in which the D. C. voltage for the operation of the transmitter is subject to inherent and undesired variations of potential. The criterion for proper couplings is that the plate current be maintained at a value which bears a direct relation to the applied plate voltage. There are therefore two factors to be considered in determining the proper degree of coupling, the plate voltage and the plate current.

In accordance with the present invention these two factors are used to produce the two positive D. C. control voltages which are independently variable, the system being designed to maintain the two at a predetermined relationship. Thus, the D. C. potential across resistor 49 and the D. C. potential across voltage divider 53 are initially adjusted to have equal values when the coupling is corrected for the normal operating potential. In such a condition the motor 47 remains at rest since no 60 cycle voltage is developed across the cathode resistor 25. However, if the voltage developed by generator 41 decreases, the motor 47 is caused to rotate in such a direction that the coupling between the load and the transmitter output tube is reduced. As is well known, the reduction of coupling changes the plate current in the amplifying tube, and this change is carried on until the plate current assumes the proper value, as determined by the voltage drop across resistor 49. When this voltage again equals the control voltage from the D. C. generator the system is restored to balance. If, however, the generator voltage increases, then the motor rotates in the opposite direction and the coupling will be increased until the plate current again bears the prescribed relationship and the system is again returned to balance.

It should further be noted that the system also controls changes in the load which may be due to movement of the antenna or other causes which tend to change the load on the output tube. This reflects a change in the plate current which upsets the balance between the two D. C. control voltages in such a direction as to increase or decrease the antenna coupling as the case may be, so as to restore the operation of the tube to the normal condition.

While the invention has been illustrated in connection with a radio transmitter, the invention is also useful in connection with radio frequency generators which are used for dielectric or induction heating. In such case the antenna load would be replaced by the load of the device being heated, which, as is well known, reflects considerable variation on the transmitter as it passes through its heating cycle.

A still further advantage of this invention lies in the utilization of a second harmonic rejection filter, particularly in follow-up systems of the type illustrated in Fig. 2. It is well known that the inclusion of a resonant circuit in a follow-up system increases instability of the type known as "hunting." Since the undesired harmonic frequencies are removed by a sharply tuned rejection filter, no resonant circuits are utilized tuned to the operating frequencies of 60 cycles and therefore the tendency to hunt is greatly reduced.

What I claim is:

1. A system for converting the difference between two variable voltages to an alternating voltage whose phase and amplitude correspond to the sense and amplitude of said difference, comprising a pair of thermionic tubes having cathode, grid and plate electrodes, means for applying said variable voltages to said grid electrodes respectively in a polarity positive with respect to the cathodes; means for impressing an alternating voltage between said cathode and grid electrodes of one of said tubes and an alternating voltage of opposite phase between said cathode and grid electrodes of the other of said tubes; means for applying a D. C. potential to said plate electrodes, impedance means in circuit with said cathode electrodes, and output means connected to said impedance.

2. In a device for controlling the direction of rotation of a motor in accordance with the difference between two variable D.-C. voltages, the combination which includes a pair of thermionic tubes having cathode, grid and plate electrodes; control means for varying the D. C. potential of said grid electrodes respectively comprising means for applying each of said D.-C. voltages respectively to said grids in a polarity positive with respect to said cathodes; means for impressing an alternating voltage between said cathode and grid electrodes of one of said tubes and an alternating voltage of opposite phase between said cathode and grid electrodes of the other of said tubes; means for applying a D. C. potential to said plate electrodes, a common resistor in circuit with said cathode electrodes, a reversible motor of the type in which the direction of rotation is controlled by the phase of the alternating current applied to at least one winding thereof; and means for applying the alternating voltage across said resistor to the winding of said motor.

3. In a device of the character described, control means for producing two D. C. voltages which may be varied in amplitude independently; a pair of thermionic discharge devices having cathode, grid and anode electrodes; means for applying said D. C. voltages to said grid electrodes respectively in a polarity positive with respect to the cathodes; means for impressing alternating voltages of opposite phase on said grid electrodes; means for applying a fixed D. C. potential to said anode electrodes, means for deriving an output voltage from said devices whose phase is a function of the relative amplitudes of said D. C. voltages; and means for maintaining each grid electrode slightly negative with respect to its associated cathode for all values of D. C. voltage applied thereto.

4. A device of the character described in claim 3 in which said means for deriving an output voltage includes an impedance in circuit with said cathode electrodes, said impedance also providing degenerative feedback for maintaining said grid electrodes slightly negative.

5. In a device for maintaining constant a pre-established relationship between two conditions, each subject to variation, means for producing D. C. voltages whose amplitudes vary with changes in said conditions and which are equal when said pre-established relationship is established; a pair of thermionic discharge devices having cathode, grid and anode electrodes, means for applying said D. C. voltages to said grid electrodes, means for also impressing alternating voltages of opposite phase on said grid electrodes, means for applying a fixed D. C. potential to said anode electrodes, means for deriving an alternating output voltage from said device whose phase is a function of the sense of variation from said relationship, and means responsive to said alternating voltage for restoring said pre-established relationship between said conditions.

6. A device of the character described in claim 5 in which said means responsive to said alternating voltage includes a reversible motor having two windings, means for applying a source of A. C. power to one of said windings, and means for establishing a quadrature phase relationship between said source and the A. C. voltage applied to said motor by said discharge devices.

7. In a radio frequency power generator comprising an output tube and a load variably coupled thereto, means for deriving a first D. C. control voltage proportional to the plate current of said output tube, a source of D. C. voltage for energizing said tube and being subject to potential fluctuations, means for deriving a second D. C. control voltage proportional to the voltage of said source and normally equal in amplitude and polarity to said first D. C. control voltage; a pair of thermionic discharge devices having cathode, grid and anode electrodes, means for applying said control voltages to said grid electrodes respectively, means for applying alternating voltages of opposite phase to said grid electrodes respectively, a resistor in circuit with the cathode electrodes of said devices for producing an output voltage, a reversible motor energized by said output voltage, and means for varying the coupling of said load to said output tube in a direction which compensates for any change in either of said control voltages.

SIDNEY WALD.

REFERENCES CITED

The following references are of record in the file of this patent:

UNITED STATES PATENTS

| Number | Name | Date |
|---|---|---|
| 2,113,928 | Behr | Apr. 12, 1938 |
| 2,179,265 | Luck | Nov. 7, 1939 |
| 2,306,479 | Jones | Dec. 29, 1942 |
| 2,359,734 | Hood | Oct. 10, 1944 |
| 2,391,532 | Wilmotte | Dec. 25, 1945 |

OTHER REFERENCES

Article: "The Amplification of Direct-Current Signals Through Alternating-Current Circuits," by T. J. Goldsmith, DuMont Oscillographer 3, Numbers 6-7, 1 (1939).